(12) United States Patent
Rischen et al.

(10) Patent No.: US 10,001,230 B2
(45) Date of Patent: Jun. 19, 2018

(54) PRESS FITTING AND USE THEREOF

(75) Inventors: Christian Rischen, Eslohe (DE);
Bernd Franke,
Finnentrop-Schonholthausen (DE);
Andreas Muller, Freudenberg (DE)

(73) Assignee: Viega Technology GmbH & Co. KG,
Attendorn (DE)

(*) Notice: Subject to any disclaimer, the term of this patent is extended or adjusted under 35 U.S.C. 154(b) by 91 days.

(21) Appl. No.: 13/333,157

(22) Filed: Dec. 21, 2011

(65) Prior Publication Data

US 2012/0161438 A1 Jun. 28, 2012

(30) Foreign Application Priority Data

Dec. 22, 2010 (DE) .................... 10 2010 055 531

(51) Int. Cl.
| | | |
|---|---|---|
| F16L 21/00 | (2006.01) | |
| F16L 13/14 | (2006.01) | |
| B21C 37/28 | (2006.01) | |
| B21D 17/02 | (2006.01) | |
| B21D 19/00 | (2006.01) | |

(52) U.S. Cl.
CPC ............ *F16L 13/142* (2013.01); *B21C 37/28* (2013.01); *B21D 17/025* (2013.01); *B21D 19/00* (2013.01)

(58) Field of Classification Search
USPC .... 285/133.21, 133.3, 133.6, 256, 349, 374, 285/382, 239, 345–346, 399, 382.1–382.2
See application file for complete search history.

(56) References Cited

U.S. PATENT DOCUMENTS

| | | | | |
|---|---|---|---|---|
| 1,901,820 | A * | 3/1933 | Parker | 285/93 |
| 2,184,376 | A * | 12/1939 | Beyer et al. | 285/105 |
| 3,539,205 | A * | 11/1970 | Johnson, Jr. et al. | 285/5 |
| 5,303,964 | A * | 4/1994 | Yi | F16L 19/08 285/322 |
| 6,058,755 | A * | 5/2000 | Viegener | 72/292 |
| 6,427,309 | B1 | 8/2002 | Viegener | |
| 6,581,983 | B1 * | 6/2003 | Viegener | 285/382 |
| 6,805,385 | B2 * | 10/2004 | Viegener | 285/382.2 |
| 7,942,456 | B2 * | 5/2011 | Duggan et al. | 285/374 |
| 7,987,690 | B2 * | 8/2011 | Duggan et al. | 72/370.03 |
| 8,235,427 | B2 * | 8/2012 | Jones et al. | 285/339 |
| 2008/0157524 | A1 * | 7/2008 | Jones et al. | 285/374 |
| 2009/0173130 | A1 | 7/2009 | Duggan et al. | |
| 2009/0174182 | A1 * | 7/2009 | Duggan et al. | 285/331 |

FOREIGN PATENT DOCUMENTS

| | | |
|---|---|---|
| DE | 10130110 C1 | 10/2002 |
| DE | 20300918 U1 | 4/2003 |
| DE | 102005062738 A1 | 7/2007 |
| EP | 1081423 A1 | 3/2001 |

* cited by examiner

*Primary Examiner* — Peter M. Cuomo
*Assistant Examiner* — Fannie C Kee
(74) *Attorney, Agent, or Firm* — The Webb Law Firm

(57) ABSTRACT

A press fitting, including a tubular component and an end portion of the tubular component which can be compressed to make a connection. The end portion has an opening to receive a tube and a first region having an annular ridge to receive a sealing ring. A second region is arranged on the side of the ridge adjacent the opening and a third region is arranged on the side of the ridge remote from the opening. The overall wall thickness of the press fitting in the second region is increased at least in a section or sections in comparison with the wall thickness of the tubular component in the third region.

6 Claims, 19 Drawing Sheets

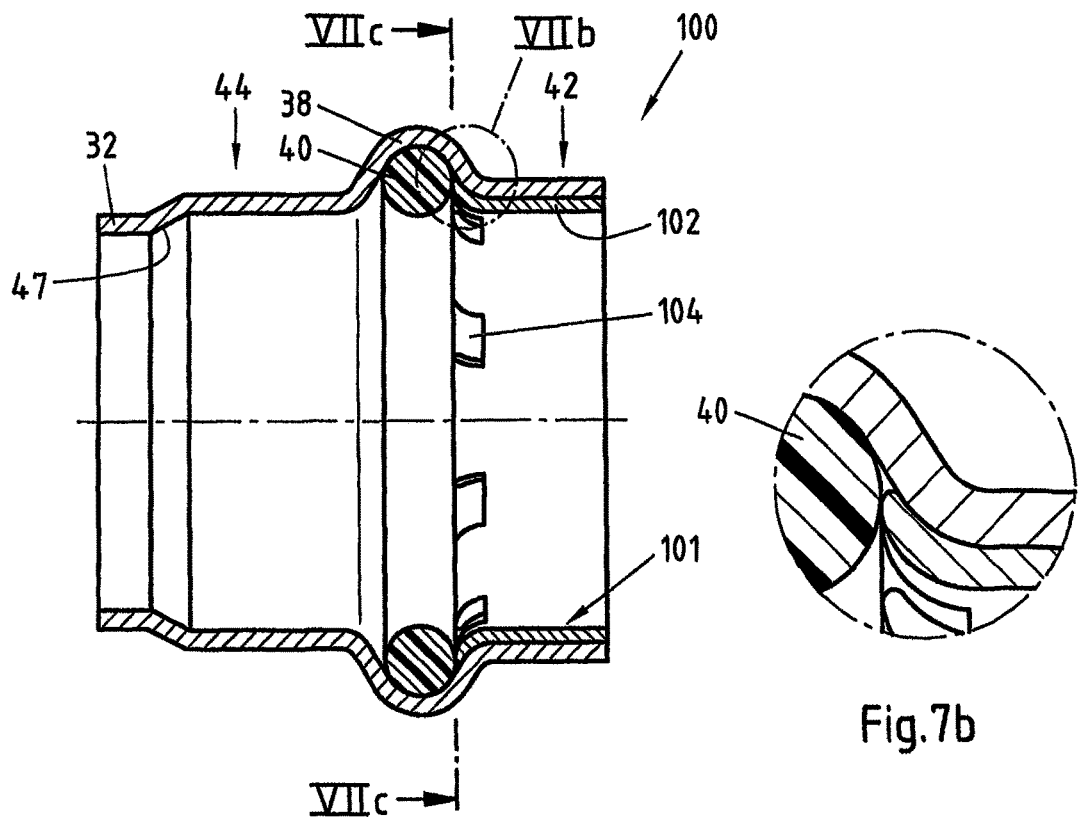
Fig.7a
Fig.7b
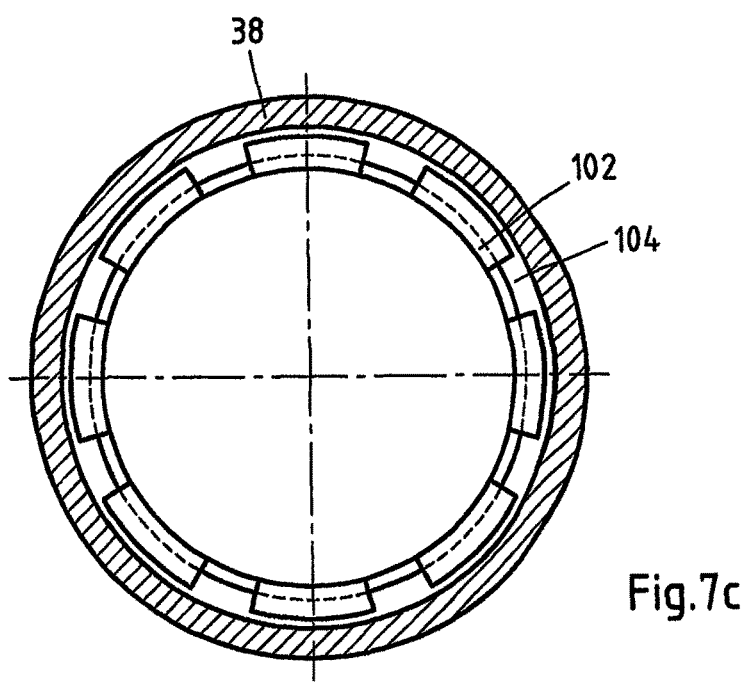
Fig.7c

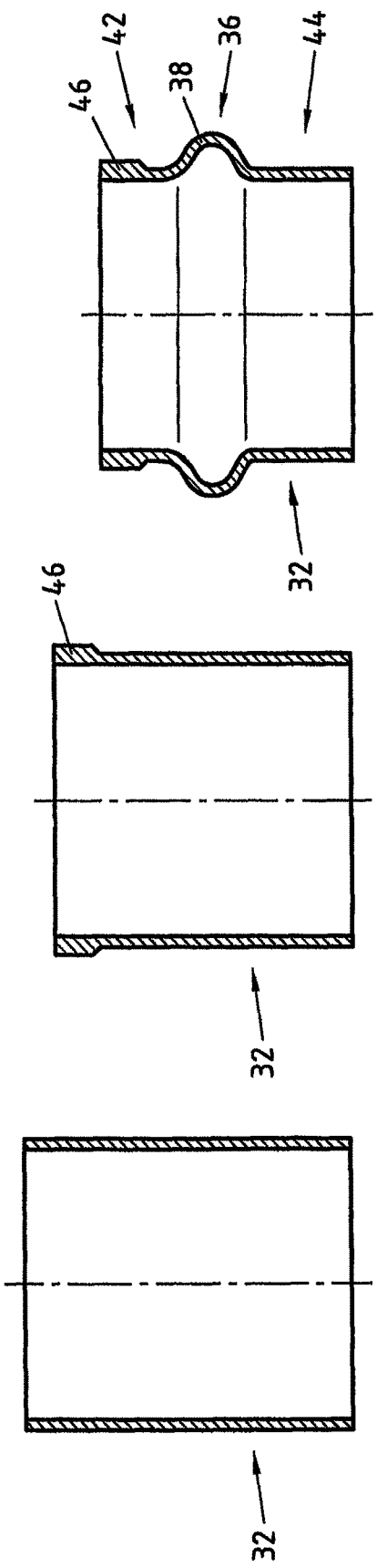

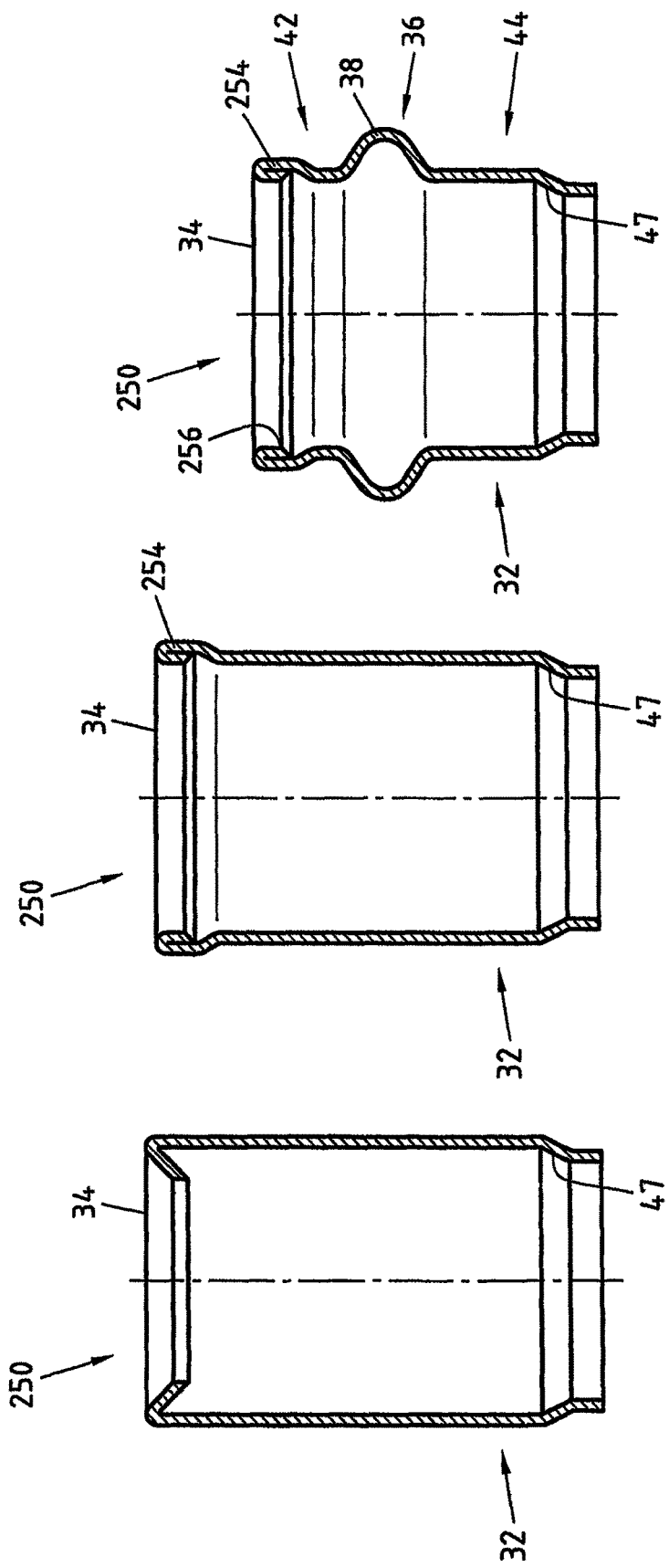

PRESS FITTING AND USE THEREOF

BACKGROUND OF THE INVENTION

Field of the Invention

The invention relates to a press fitting comprising a tubular component and having an end portion of the tubular component which can be compressed to make a connection, the end portion having an opening to receive a tube, the end portion having a first region having an annular ridge to receive a sealing ring, and the end portion having a second region arranged on the side of the ridge adjacent the opening and a third region arranged on the side of the ridge remote from the opening.

Description of Related Art

Press fittings of this kind are known from the prior art and are used in particular in the field of piping systems for example in domestic piping systems. To connect a pipe or tube to a press fitting of this kind, one end of the pipe or tube is inserted in the opening in the end portion of the press fitting until the end of the pipe reaches into the third region of the tubular component. The press fitting can then be compressed onto the end of the pipe or tube in the first and second regions, and possibly in the third region too, with a pressing tool, which is usually of a pliers-like form with two pressing jaws. The compression in the second region and optionally in the region results in the end of the pipe or tube being securely fixed to the fitting. What is more, a sealing ring provided in the annular ridge is pressed against the outer surface of the end of the pipe or tube as the compression takes place, thus sealing the connection. A long-lasting sealed connection can easily be made in this way between the press fitting and the pipe or tube without any need for a welding or soldering process.

Because press fittings of this kind often consist of a copper alloy or of steel, and in particular of stainless steel, the cost of the material represents a high proportion of the cost of producing the press fittings.

SUMMARY OF THE INVENTION

The object underlying the present invention is therefore to provide a press fitting which can be produced in a more economical way but nevertheless gives a good seal and has a long life.

In the press fitting specified at the beginning, this object is achieved according to the invention in that the overall wall thickness of the press fitting in the second region is increased at least in a section or sections in comparison with the wall thickness of the tubular component in the third region.

What is meant by the overall wall thickness of the press fitting is the overall thickness of the wall, which may possibly comprise a plurality of layers. However, layers which are easily displaceable in the axial direction relative to the tubular component, such for example as the pipe to be connected itself or sleeves which are not connected to the tubular component, are ignored in determining the overall wall thickness. The wall thickness of the tubular component means simply the wall thickness of the one-piece tubular component.

It has been found that the amount of material required to produce a press fitting can be reduced with the press fitting according to the invention. It has not been possible to achieve any such reduction hitherto because the compression by a pressing tool calls for the press fitting to be of a certain minimum wall thickness. What is more, press fittings need to be compatible with the press tools available on the market and the press fittings thus in particular need to be of specified external dimensions to be accepted by the market. Also, the internal dimensions of the press fittings are preset by the external dimensions of the pipes or tubes to be connected.

However, it has now been found that the minimum wall thickness required to produce a sealed and long-lasting pressed joint is only needed in the second region. The wall thickness of the tubular component can be lower than this in the third region, thus enabling material to be saved at this point in the tubular component. At the same time, adequate strength for the pressed joint and compatibility with the press tools available on the market can nevertheless be achieved due to the increased overall wall thickness of the press fitting in the second region.

The saving on material is thus achieved in the press fitting according to the invention in particular by virtue of the fact that the overall wall thickness of the press fitting is increased selectively. At least in a section or sections, and in particular in the third region, the wall thickness of the tubular component can be reduced in comparison with this. In particular, the tubular component may thus be of lower wall thicknesses than the tubular components of prior art press fittings, at least in a section or sections.

During the compression of the fitting, the first region is deformed in such a way that the O-ring which is held within the ridge which is formed there seals the pipe or tube, which has been slid in, off from the fitting. In the second region and possibly the third region, the deformation during the compression results in a section or sections of the fitting being pressed into the material of the pipe or tube. This causes the pipe or tube to be secured axially relative to the fitting. The compression of the second region and possibly of the third region regularly produces a polygonal shape and in particular a hexagonal shape. Thus, by a suitable combination of the different regions of the fitting, both a sealing function and a retaining function are obtained.

The press fitting may take any desired form for example a pipe connector, a tee or an elbow member. A particularly large saving on material is achieved in the case of press fittings which have a particularly large third region, as is the case with elbow members for example.

The safe compressibility of the press fitting and its strength when being compressed can preferably be increased by making the increase in the overall wall thickness in the second region extend to the opening of the end portion. The press fitting can be produced particularly economically from a tube whose wall thickness substantially corresponds to the wall thickness of the third region.

In a first embodiment of the press fitting, the overall wall thickness of the press fitting in the second region is increased at least in a section or sections by at least 50%, preferably by at least 75% in particular by at least 100% in comparison with the wall thickness of the tubular component in the third region. It has been found that the wall thickness in the third region is still sufficiently large to ensure that the press fitting can be stably and securely compressed. At the same time, the difference which is thereby obtained between the overall wall thickness in the second region and the wall thickness in the third region produces a further saving in material.

Particularly large savings on the cost of the material can be achieved in a further embodiment of the press fitting by having the tubular component consisting of copper or a copper alloy, in particular of red brass, or of steel. Copper or copper alloys or steels, i.e. in particular stainless steels, are often notable for their high price as materials, a price which is also subject to wide fluctuations. What is more, these materials are the preferred materials for producing press fittings and there is thus a particularly high demand for press fittings of this kind and the press fittings are produced in large numbers. Consequently, a particularly large saving can be achieved by reducing the material required for such press fittings.

A further embodiment of the press fitting results from the tubular component consisting of copper or a deformable copper alloy or a machinable copper alloy and in particular red brass and, where the nominal size of the press fitting is between DN 12 and DN 35, from the wall thickness of the tubular component being between 0.85 and 1.3 mm in the third region and between 1.3 and 2.4 mm in at least a section or sections in the second region, or, where the nominal size of the press fitting is more than DN 35, from the wall thickness of the tubular component being between 1.0 and 1.5 mm in the third region and between 1.5 and 2.5 mm in at least a section or sections in the second region.

A further embodiment of the press fitting arises from the tubular component consisting of steel, and in particular of stainless steel and, where the nominal size of the press fitting is between DN 12 and DN 35, from the wall thickness of the tubular component being between 0.5 and 1.3 mm, and in particular between 0.5 and 0.7 mm, in the third region and between 1.0 and 2.5 mm in at least a section or sections in the second region, or, where the nominal size of the press fitting is more than DN 35, from the wall thickness of the tubular component being between 1.0 and 1.8 mm in the third region and between 1.5 and 2.5 mm in at least a section or sections in the second region.

For existing prior art press fittings, a continuous wall thickness of between 1.35 and 1.6 mm was considered necessary at a nominal size of between DN 12 and DN 35 and one of between 1.8 and 2.2 mm at a nominal size of more than DN 35. By reducing the wall thickness of the tubular component in the third region, a considerable reduction in the cost of the material used can be achieved together with equally good strength and compressibility for the press fitting.

What is meant by the nominal size of the press fitting in the context of this application is the nominal size under DIN EN 1057 for copper and copper alloys and under DIN EN 10312 for stainless steel.

The overall wall thickness in the first region and possibly in the second region is increased at least in a section or sections by an integral local thickening of the tubular component. Only a section of the second region, the whole of the second region, or even the first region and the second region may be of a thickened form in this case. In this way the increased overall wall thickness can easily be produced by the tubular component itself. What is more, a uniform appearance can be obtained in this way for the press fitting because any separate members for increasing the overall wall thickness can be dispensed with.

What is meant by an integral local thickening is that the increased overall wall thickness in the second region is caused at least in part by the tubular component itself. For this purpose, the wall thickness of the tubular component may for example be increased in a section or sections.

The integral local thickening can thus be achieved in a particularly simple way upsetting the tubular component, thus causing a local increase in the wall thickness of the tubular component.

Independently of the press fitting which has been described above, the present invention also relates to a method of producing a press fitting in which an end portion of the tubular component is upset from the end, thus increasing the wall thickness of a section of a preset length adjacent the open end in comparison with the wall thickness of the piece of tube in the starting state, in which a ridge is formed in the piece of tube, and in which the piece of tube is expanded at least for the length of an end portion, the end portion having a first region having the ridge, a second region arranged on the side of the ridge adjacent the opening and a third region arranged on the side of the ridge remote from the opening.

The expansion may be performed in this case before or after the upsetting and in particular before or after the forming of the ridge. The sequence of the individual steps of the work done on the press fitting may therefore be selected to be such as is best as a function of the material and dimensions of the press fitting.

As an alternative to the press fittings described above or as an addition thereto, a section or sections of the tubular component may exist in the form of two or a plurality of layers one above another. For this purpose, the end portion of the tubular component for example may be at least partially folded over inwards or outwards, thus making the tubular component of a two-layered form in the region of the folding-over. What is created in this way is, rather than a thickening, an integral two-layered arrangement which can be produced by folding over.

Independently of the press fitting having a folding-over which has been described above, the invention also relates to a method of producing a press fitting in which an end portion of the tubular component is folded over outwards at the end for a preset length, in which the component is expanded for the length of an end portion, and in which a ridge is formed in the component, the end portion having a first region having the ridge, a second region arranged on the side of the ridge adjacent the opening and a third region arranged on the side of the ridge remote from the opening.

As an alternative to this, the invention also relates, independently, to a method of producing a press fitting in which a component is folded over inwards at the end for a preset length, in which the component is expanded for the length of an end portion, and in which a ridge is formed in the component, the end portion having a first region having the ridge, a second region arranged on the side of the ridge adjacent the opening and a third region arranged on the side of the ridge remote from the opening.

In the last two methods described too, the expansion may be performed before or after the folding-over and in particular before or after the forming of the ridge. Therefore, in these cases too, the sequence of the individual steps of the work done on the press fitting may be selected to be such as is best as a function of the material and dimensions of the press fitting.

A region of the tubular component which is adjacent the opening is thus expanded and bent over, and the tubular component is thus in the form, in a section or sections, of two layers one above the other but is equally in an integral, i.e. one-piece, form.

The versatile way in which the press fitting can be used is increased in a further embodiment by increasing the overall wall thickness in a second region by means of a separate annular member. The thickness and/or material of the annular member which produces the increased overall wall thickness can be selected in this way to suit the intended purpose. What also becomes possible by this means is a simple way of producing the press fitting because it is possible to dispense with a forming step at a later stage applied to the tubular component.

The annular member may in particular consist of the same material as the tubular component or of a different material, and in particular of a plastic material, steel or an aluminium alloy. The plastic materials which may be considered are for example polypropylene (PP), polyamide (PA) or polyoxymethylene (POM), each without or without glass fibre reinforcement. If the annular member consists of the same material as the tubular component, it can be ensured that the press fitting is of a uniform appearance. When a different material is used, its properties can be optimised for the given intended purpose, to simplify the compression process for example. In particular, less expensive materials, i.e. less noble alloys, can also be used for the annular member, thus giving a further reduction in the cost of the material used for the press fitting. Because the annular member does not come into contact with the media carried in the press fitting, the material can be selected without regard for its corrosion resistance and/or suitability for drinking water. To stop any constant corrosion, an intermediate layer may be provided between the annular member and the tubular component, for example by coating the tubular component and/or the annular member.

In a further embodiment, it is ensured that the press fitting can be compressed securely and easily by fixing the annular member to the tubular component, at least in the axial direction, by a connection made by force fit, by bonding or by friction fit. In this way, the annular member becomes non-displaceable axially relative to the tubular component and the annular member will thus not slip or fall or drop out in the course of the compression.

What are meant by the axial direction are the directions parallel to the central axis of the tubular component. What is meant by fixing in the axial direction is that the annular member cannot be displaced in the axial direction relative to the tubular component, and in particular cannot be displaced by hand, or can only be so displaced by applying considerable force. The production of the press fitting may in particular, it is true, include the annular member being slid on or in in the axial direction. When the fitting is being fitted, on site for example, it is preferably no longer possible for the annular member to be displaced in the axial direction by the person doing the fitting.

In a further embodiment of the press fitting, the annular member is arranged outside the tubular component. It is possible by this means for the press fitting to be produced in a particularly easy way because the increase in the overall wall thickness is achieved simply by the fitting on of an external annular member. It is also possible to obtain with this embodiment a reduction of approximately 30% in the pressing force required for compression, preferably by selecting a suitable material for the annular member. The annular member may in particular take the form of a closed ring or a slotted C-ring. In the second region, the inside diameter of the tubular component preferably substantially corresponds to the outside diameter of the tube to be inserted.

A further embodiment of the press fitting is characterised in that the tubular component has an expansion in the second region to receive the annular member and in that the annular member is arranged inside the tubular component. In this way the tubular member does not come into contact with the press tool in the course of the compression and it thus cannot be detached from the press fitting by the pressing forces which occur in the course of the compression. A uniform appearance for the press fitting can also be achieved in this way. The inside diameter of the annular member preferably substantially corresponds to the inside diameter of the press fitting in the third region. The annular member may also be designed in particular to improve the compression connection between the press fitting and the pipe or tube.

The annular member may also take the form of a retaining member which, by means of elevations, projections and/or cutting edges for example, ensures that the tube inserted in the press fitting is secured. The annular member preferably has a continuous outer face and thus rests against the inside face of the tubular component around its entire circumference and for substantially its entire length. This produces a continuous increase in the overall wall thickness in the second region. Fixing means, for example projections or cutting edges, may be provided on the side adjacent the inner face of the tubular component, thus ensuring that the annular member is securely fixed in the tubular component, in particular in the axial direction. The annular member may preferably reach as far as the opening in the end portion. It is also preferable for the annular member to be of constant thickness around substantially the entire circumference. Local weak points in the connection at the circumference of the annular member can be avoided in this way when the compression takes place.

An additional saving on material may also be achieved by increasing the overall wall thickness of the press fitting in the second region in comparison with the overall wall thickness in the third region.

In another embodiment of the press fitting, the outside diameters of the press fitting are substantially the same in the second and third regions. In this way, the press tool can act evenly on the second and third regions, thus enabling substantially symmetrical compression to take place. Also, it is possible in this way for press tools which are known from the prior art and are widely available on the market to continue to be used.

In a further embodiment, additional sealing-off between the press fitting and a tube is achieved by providing a sleeve member of an elastic material, and in particular of an elastic plastic material, within the tubular component in the third region. The gap between the press fitting and the tube which is inserted can also be filled by the sleeve member, thus enabling the formation of deposits in the press fitting or the contamination thereof with germs to be reduced or even prevented. The sleeve member may preferably consist of a plastic material approved for hygienic connectors for example of PSU (polysulphone), PPSU (polyphenylsulphone) PVDF (polyvinylidene fluoride) or PTFE (polytetrafluoroethylene or Teflon).

In a further embodiment of the press fitting, the sleeve member has a thickening at the end remote from the opening, having, as an option, an abutment face for a tube being inserted. The thickening enables the widening of the cross-section of the interior passage to be optimised regarding fluidic aspects at the transition from the tube to the press fitting. The formation of eddies and the loss in pressure which these involve can be reduced in this way. The depth of insertion of the tube to be connected to the press fitting can be fixed by an optional abutment face. The tube also rests in this way directly against the thickening of the sleeve member, thus forming in the press fitting an interior passage which is optimised regarding fluidic aspects.

In a further embodiment, improved sealing-off of the press fitting which is in particular more long-lasting can be achieved by making the wall thickness of the tubular component smaller in the region of the ridge than the overall wall thickness of the press fitting in the second region. The smaller wall thickness which this produces in the first region means that more space is available in the ridge to allow an O-ring of greater thickness to be used. Because of the larger areas of an O-ring of greater thickness which rest against the press fitting and against the tube, it is possible to obtain a better seal and improved corrosion protection and/or protection against oxidation. The O-ring preferably consists in this case of the elastomeric materials which are known to be used for this purpose.

In a further embodiment of the press fitting, an annular ridge cover which covers over the ridge is provided outside the tubular component. The ridge cover is able to compensate for a reduced wall thickness of the tubular component in the first region, thus enabling prior art press tools to be used for compressing the press fitting. Also, the overall wall thickness is increased in this way in the first region, thus making a stronger compression joint possible. The ridge cover may be formed to extend round the full circumference or may be slotted and may in particular take the form of a C-ring for pressing on. It may consist in particular of plastic material for example of polypropylene or fibre-reinforced polyacrylate (PA-6). The ridge cover may also be formed integrally with the annular member. The ridge cover also forms a separate invention in its own right.

Press fittings of the above-mentioned kind are suitable in accordance with further teaching of the invention in particular for piping and tubing systems for drinking water or non-drinking water and for gas and heating piping and tubing systems. It has been found that, even with the saving on material which is achieved with these press fittings, there is an assurance of a long-lasting and secure compression joint such as is required in particular with in-wall domestic piping and tubing. What can be achieved with these press fittings is that, in spite of the saving on material, the medium carried comes into contact only with high-grade materials. The press fittings are therefore in particular suitable for use as hygienic connectors for, for example, drinking water applications.

Other features and advantages of the invention can be seen from the following description of various exemplary embodiments in which reference is made to the accompanying drawings.

BRIEF DESCRIPTION OF THE DRAWINGS

In the drawings:

FIGS. 7a-7c show a sixth exemplary embodiment of a press fitting according to the invention, FIGS. 21a-21c show the press fitting shown in FIG. 20 at various stages of production.

DETAILED DESCRIPTION

Figure 1:
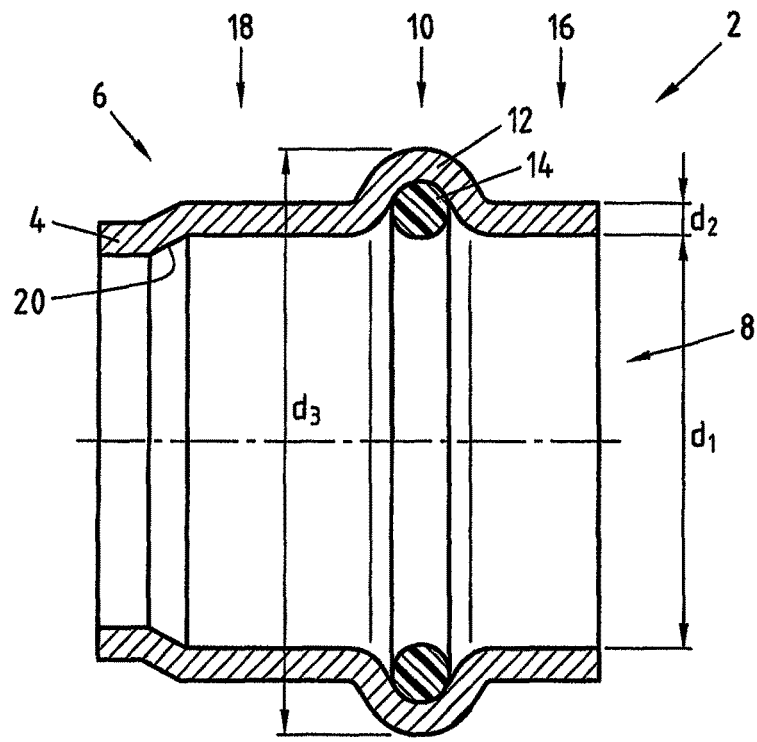
FIG. 1 shows a prior art press fitting.

FIG. 1 is a view in section of a prior art press fitting 2 comprising a tubular component 4, an end portion 6 and an opening 8 to receive a tube (not shown). The end portion 6 has a first region 10 having an annular ridge 12 in which is arranged a sealing ring 14 in the form of an O-ring. The end portion 6 also has a second region 16 which is arranged on the side of the ridge 12 adjacent the opening 8 and a third region 18 which is arranged on the side of the ridge 12 remote from the opening 8. The inside diameter $d_1$ in the second region 16 of the press fitting 2 is preset by the outside diameter of the tube to be inserted. The wall thickness $d_2$ of the press fitting 2 and the outside diameter $d_3$ in the first region 10 of the press fitting 2 are adapted to the press tools available on the market. To connect a tube to the press fitting 2, an end of the tube is slid into the opening 8 in the press fitting 2, in particular as far as a taper 20 which is provided. The press fitting 2 can then be compressed onto the tube by means of a press tool which is, in particular, pliers-like. By the compression in the second region 16 and, as an option, in the third region 18, the tube is fixed in the press fitting, while the sealing ring 14 ensures that the connection is sealed as a result of the compression in the first region 10. The wall thickness of the tubular component 4 is substantially constant in the press fitting 2.

In the exemplary embodiments shown in the Figures which follow, items of the same kind are given the same reference numerals in each of the Figures.

Figure 2:
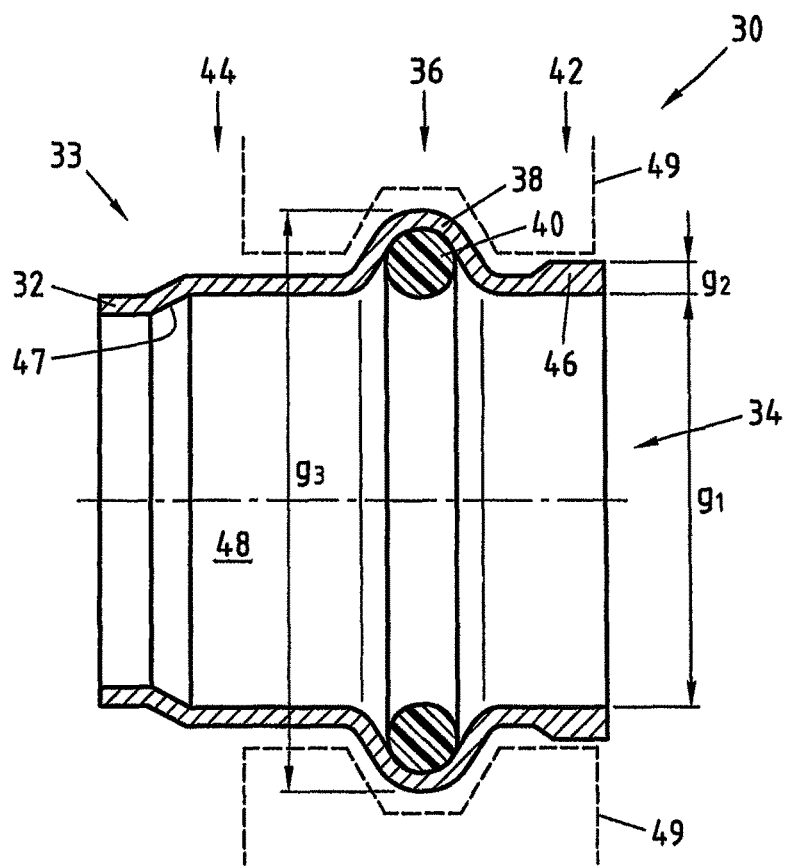
FIG. 2 shows a first exemplary embodiment of a press fitting according to the invention.

FIG. 2 is a view in section of a first exemplary embodiment of press fitting according to the invention. The press fitting 30 likewise has a tubular component 32 having an end portion 33 and an opening 34 to receive a tube (not shown). A ridge 38 and a sealing ring 40 held therein are arranged in a first region 36. The end portion 33 also has a second region 42 which is arranged on the side of the ridge 38 adjacent the opening 34 and a third region 44 which is arranged on the side of the ridge 38 remote from the opening 34.

The inside diameter $g_1$ in the second region 42 of the press fitting 30 is preset by the outside diameter of the tube to be inserted, and in the exemplary embodiment shown, it corresponds to the inside diameter $d_1$ of the press fitting 2 shown in FIG. 1.

In the second region 42, the overall wall thickness of the press fitting 30 is increased in comparison with the wall thickness of the tubular component 32 in the third region 44 by an integral local thickening 46 of a section or sections of the tubular component 32. The overall wall thickness in the second region 42 is preferably selected to be such that secure connection by compression of the press fitting 30 is possible. The overall wall thickness $g_2$ of the press fitting 30 in the second region 42 preferably corresponds to at least part of the wall thickness $d_2$ of the press fitting 2 shown in FIG. 1.

Further preferred the outside diameter $g_3$ in the first region 36 of the press fitting 30 corresponds to the corresponding outside diameter $d_3$ of the press fitting shown in FIG. 1. This makes the press fitting 30 compatible with the prior art press tools available on the market. The pressing outline 49 of a press tool of this kind is shown schematically in FIG. 2. By contrast, the wall thickness of the tubular component 32 is reduced in the other regions, and the press fitting 30 thus requires a smaller amount of material than the press fitting 2 shown in FIG. 1 and can thus be produced at a lower cost. As an abutment for a tube being inserted, the press fitting 30 may also have a taper 47 of the interior passage 48.

In particular, the overall wall thickness in the second region 42 is also increased in comparison with the wall thickness of the tubular component 32 in the first region 36. When the press fitting 30 is of the same outside diameter in the first region 36, this makes more space available for the sealing ring 40, thus enabling a sealing ring 40 of greater thickness to be used. This improves the durability of the seal provided by the compression connection.

The press fitting 30, i.e. the tubular component 32, may in particular be produced from a tube whose wall thickness substantially corresponds to the wall thickness of the tubular component 32 in the third region 44. The thickening 46 may for example be produced by upsetting the tubular component 32.

Figure 10A:
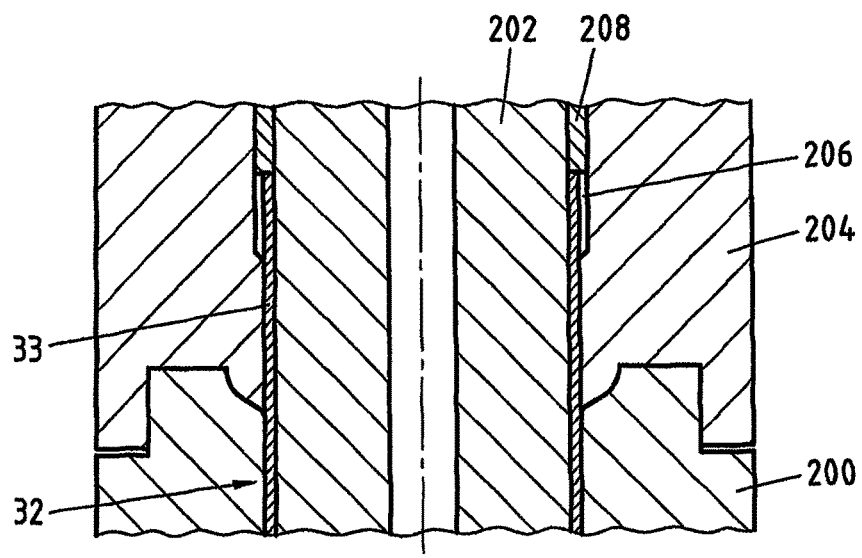
FIGS. 10a-10c are schematic views of steps in a method of producing a press fitting as shown in FIG. 2, FIGS. 11a-11c show the press fitting shown in FIG. 2 at various stages of production.
Figure 10B:
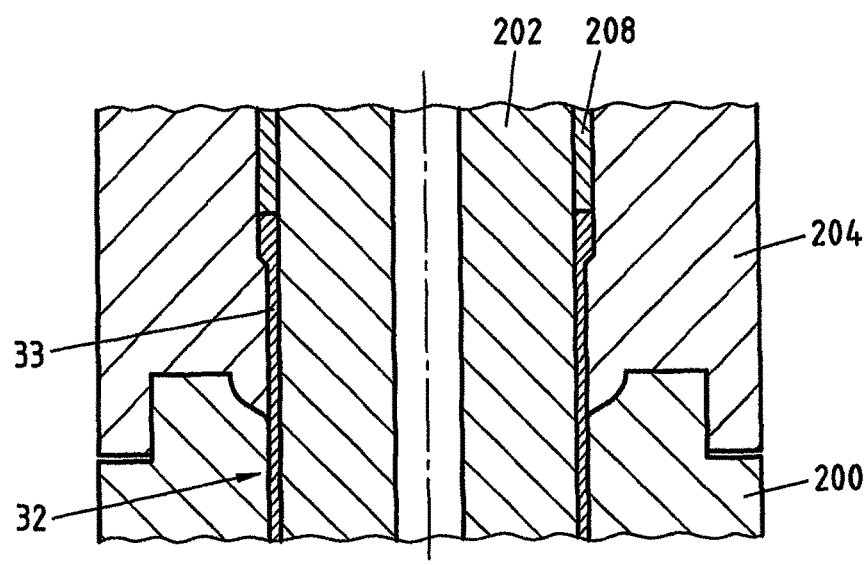
Figure 10C:
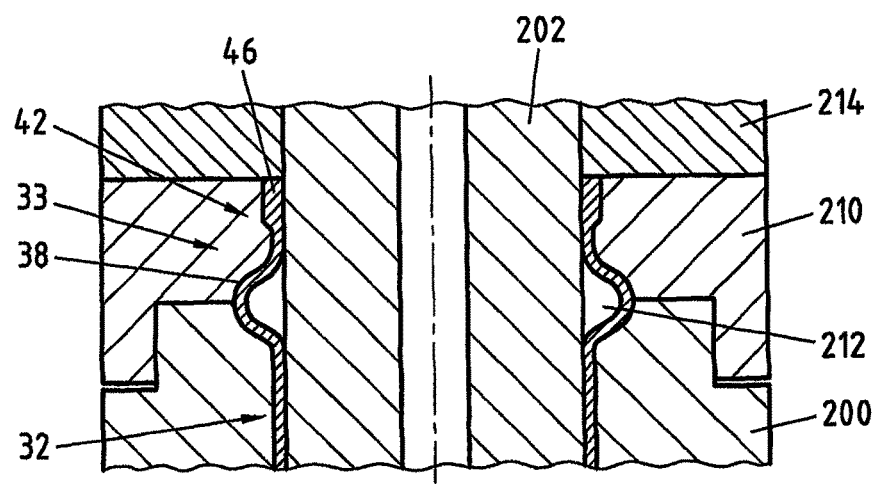

Three different situations during the production of a press fitting as shown in FIG. 2 are shown in FIGS. 10a to 10c. Basically, the steps of the method are as follows.

FIG. 10a shows the starting state of the equipment for producing the press fitting, while FIG. 11a shows the component 32 itself. For the upsetting, the component 32 is clamped in a clamping jaw 200 while a mandrel 202 is arranged in the interior of the component 32 to support the tubular component 32 in the outward direction. Also provided is a die 204 whose internal outline, in its lower region, rests against the outside of the tubular component 32 and, in its upper region, leaves a gap 206 free. Finally, an upsetting sleeve 208 is arranged between the mandrel 202 and the die 204.

Starting from this position shown in FIG. 10a, the upsetting sleeve 208 is pressed downwards, as a result of which that end of the tubular component 32 which is at the top in FIG. 10b is compressed, i.e. deformed. The upsetting sleeve 208 is moved downwards in the course of this until the whole of the gap 206 is filled by material of the component 32.

The wall thickness of the section 42 adjacent the open end of the component 32 is thus enlarged for a preset length, in the form of the thickening, in comparison with the wall thickness of the component 32 in the starting state. This is also shown in FIG. 11b.

In the next step, which is shown in FIG. 10c, a ridge 38 is formed in the component 32. For this purpose, there is arranged above the clamping jaw 200 a different die 210, the internal outlines of the clamping jaw 200 and die 210 fitting together and leaving a gap 212 between themselves and the component 32. If a further upsetting sleeve 214 is then applied from above, the tubular component 32 is again pressed downwards and the ridge thus forms as a result of the deformation of the material of the component 32. This produces the shape shown in FIG. 11c for the component 32.

A further step in the process of working is required to reach the configuration shown in FIG. 2. The tubular component 32 is expanded, at least for the length of the end portion 33 to form an abutment 47 for the tube to be inserted.

Figure 3:
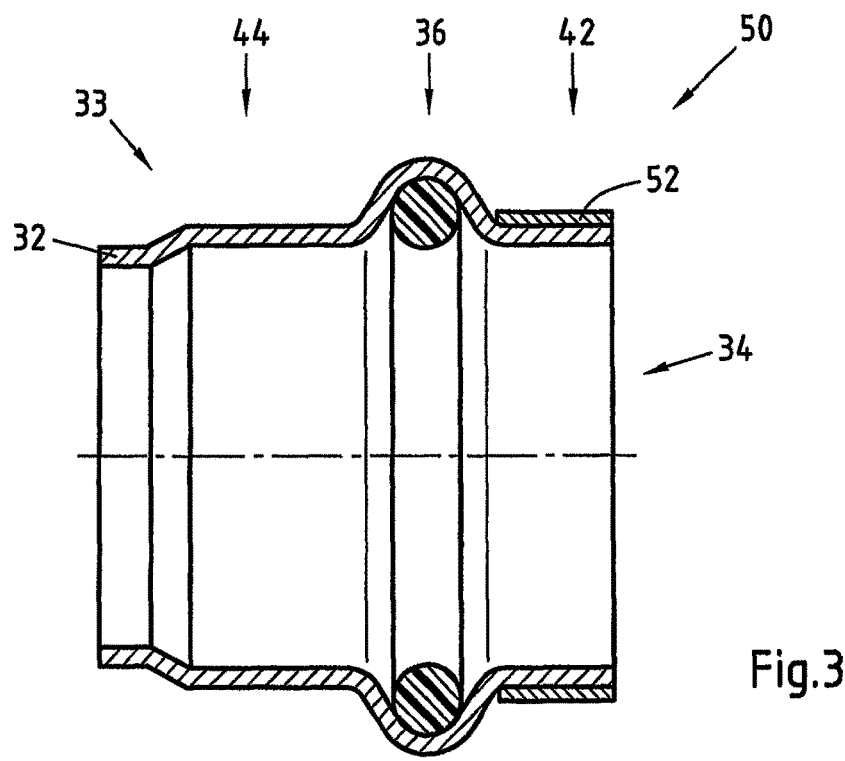
FIG. 3 shows a second exemplary embodiment of a press fitting according to the invention.

FIG. 3 is a view in section of a further exemplary embodiment of the press fitting. In the second region 42, the press fitting 50 has a separate annular member 52 which is arranged outside the tubular component 32. The overall wall thickness in the second region 42 is increased in this way in comparison with the wall thickness in the third region 44. What is meant by the overall wall thickness of the press fitting 50 is the overall thickness of the two layers lying one on top of the other formed by the tubular component 32 and the annular member 52. Because of the increase in the overall wall thickness in the second region 42, there is once again an assurance that the press fitting 60 can be securely compressed onto a tube (not shown). At the same time, a section or sections of the tubular component 32 may be of a thinner wall thickness, thus reducing the cost of the material used for the press fitting 50. The annular member 52 may for example consist of the same material as the tubular component 32. Alternatively, the annular member 52 may also consist of a different material, such for example as of an aluminium alloy, steel or plastic material.

Figure 4:
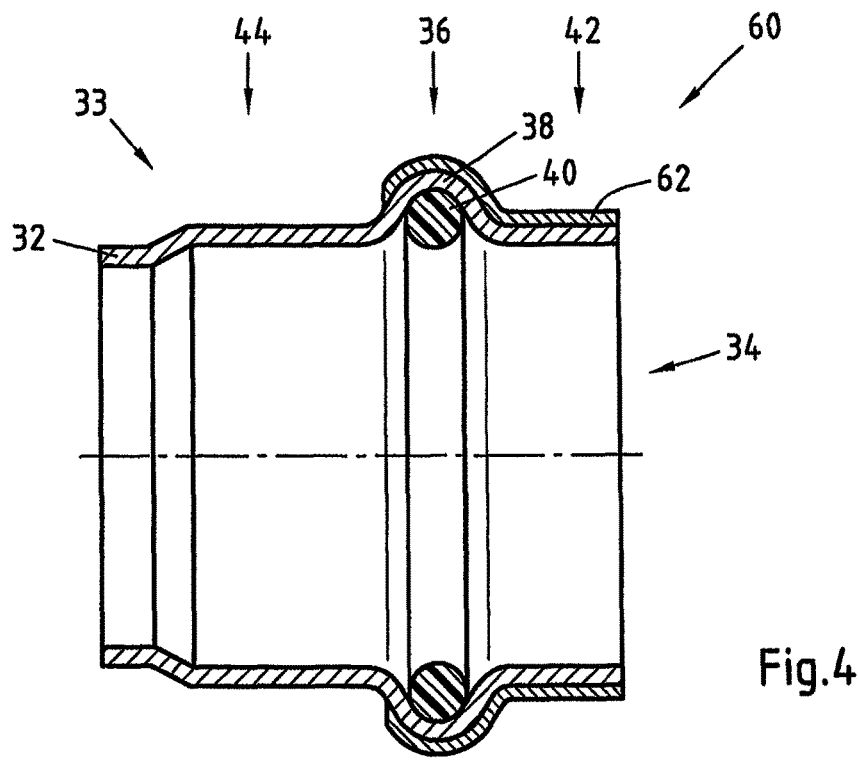
FIG. 4 shows a third exemplary embodiment of a press fitting according to the invention.

FIG. 4 is a view in section of a fourth exemplary embodiment of the press fitting. The press fitting 60 differs from the press fitting 50 shown in FIG. 3 in that the separate annular member 62 extends at least partly into the first region 36 of the end portion 33. In this way, the reduced wall thickness of the tubular component 32 in the first region 36 can be compensated for, thus achieving improved compressibility for the press fitting. A sealing ring 40 of a thickness usual in the prior art press fittings can also be used. The partial covering of the ridge 38 by the annular member 62, i.e. by the ridge cover, also provides additional protection for the ridge 38 against the particularly high compression forces which occur in this region during the compression.

Figure 5A:
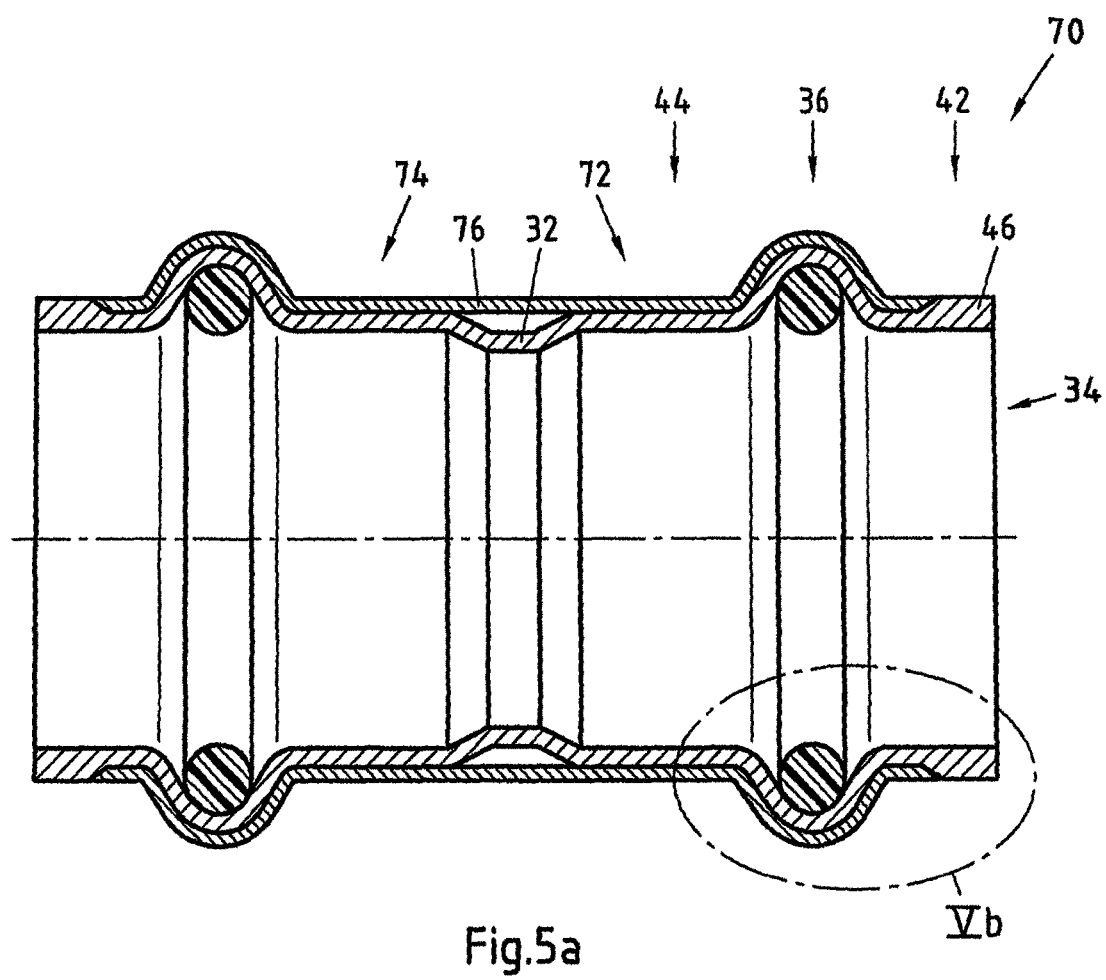
FIGS. 5a-5b show a fourth exemplary embodiment of a press fitting according to the invention.
Figure 5B:
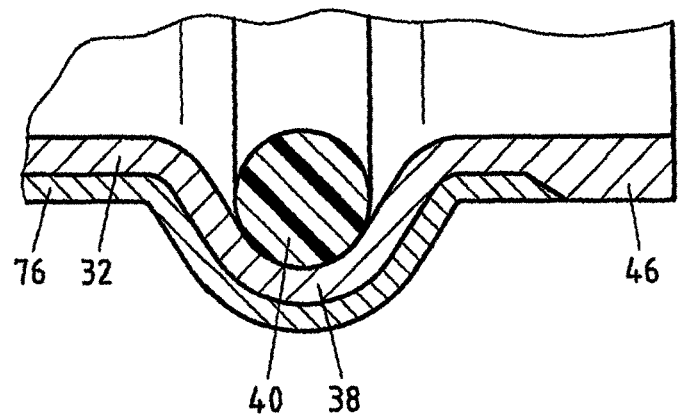

A view in section of a further exemplary embodiment of the press fitting is shown in FIG. 5. FIG. 5b is an enlarged view of a detail of FIG. 5a. The press fitting 70 takes the form of a symmetrical tube connector, having two end portions 72, 74, with which two tubes can be connected together. In what follows it will be only the right-hand end portion 72 which will be described because the way in which the second end portion operates can be seen from this, mutatis mutandis. The end portion 72 differs from the end portion 33 of the press fitting 2 shown in FIG. 2 in that there is arranged on the outside, around the tubular component 32, in the second region 42, a separate annular member 76 which extends over the first and third regions to the end portion 74. The annular member 76 may for example be produced from a less expensive material than the tubular component 32. Because of the annular member 76, the end portion 72 is of a substantially constant overall thickness in the first, second and third regions, and it is thus possible for the press fitting 70 to be compressed in a particularly symmetrical way. What is more, there is an improvement in the compressibility of the press fitting 70 by press tools which are known from the prior art and are available on the market and which have been used to date for, for example, compressing the press fitting 2 shown in FIG. 1. At the same time, the cost of the material used is reduced by the annular member 76, which consists of a less expensive material.

Figure 6A:
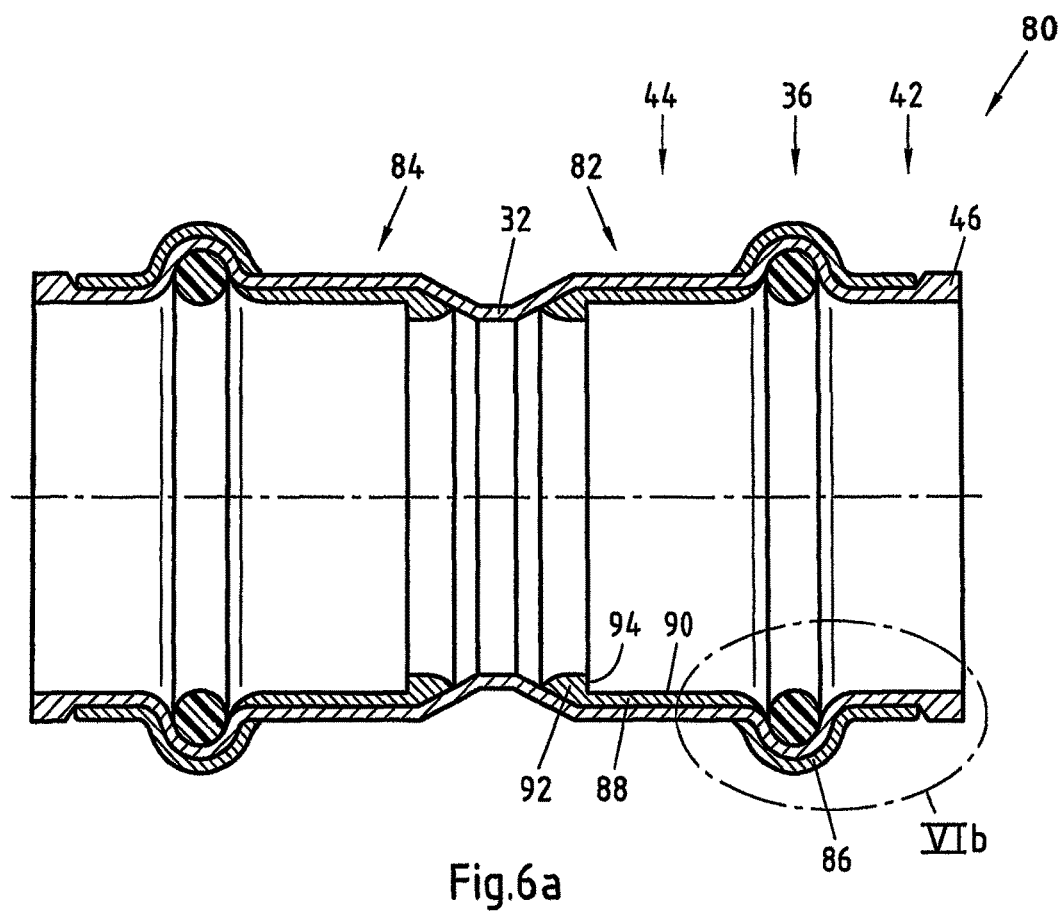
FIGS. 6a-6b show a fifth exemplary embodiment of a press fitting according to the invention.
Figure 6B:
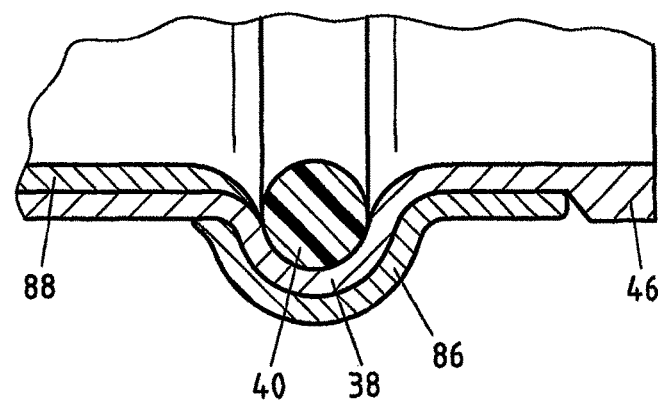

A view in section of a further exemplary embodiment of the press fitting is shown in FIG. 6a. FIG. 6b is an enlarged view of a detail of FIG. 6a. The press fitting 80 takes the form of a symmetrical tube connector, having a first end portion 82 and a second end portion 84, with which two tubes can be connected together. In what follows it will be only the right-hand end portion 82 which will be described. In the second region 42 of the end portion 82, the tubular component 32 has a thickening 46. Also provided, as an option, is an outer annular member 86 which increases the overall wall thickness in a section of the second region 42 and extends into the first region 36. In the third region 44, the outer circumference of the tubular component 32 is substantially matched to the outside circumference of the press fitting 80 in the section of the second region 42 where the overall wall thickness is increased. More even and easier compression of the press fitting 80 by a press tool can be obtained in this way because the press fitting 80 is of a substantially symmetrical configuration in the region of the ridge 38. Because the wall thickness of the tubular component 32 is reduced in the third region 44 in comparison with the second region, the tubular component 32 is of a larger inside diameter in the third region 44. This creates a free space in which for example a sleeve member 88 of elastic material, and in particular of an elastic plastic material, can be arranged. The sleeve member 88 preferably has a cylindrical region 90 and a thickening 92 which, as an option, has an abutment face 94 for a tube being inserted. The wall thickness of the cylindrical region 90 is preferably selected to be such that the inside diameter of the region 90 corresponds to the inside diameter of the second region 42, or in other words substantially to the outside diameter of the tube to be inserted (not shown). The sleeve member 88 can prevent a gap from occurring in the third region 44 between the tube being inserted and the tubular component 32. Thereby a formation of deposits and a contamination with germs of the connection can be reliably prevented, thus enabling the press fitting 80 to be used for example as a hygienic connector, preferably in piping systems for drinking water.

The depth of insertion of the tube being inserted in the press fitting can be defined by the abutment face 94. What is more, the thickening 92 is able to cause the internal outline of the tube being inserted to be brought into line with the internal outline of the press fitting 80, thus reducing the occurrence of eddies and any drop in pressure which goes hand in hand with this. For this purpose, the abutment face 94 is preferably of a height which corresponds to the typical overall wall thickness of the tube to be inserted.

Basically, the press fittings 70 and 80 may also take the form of asymmetrical tube connectors. In this way connections, tubes or pipes of different types can be connected to the press fittings. What is more, all the press fittings can, basically, take the form not only of tube connectors but also of other components for installing tubes or pipes such for example as tees, elbows or the like.

A view in section of a further exemplary embodiment of the press fitting is shown in FIG. 7a. FIG. 7b is an enlarged view of a detail of FIG. 7a. FIG. 7c is a view of the press fitting shown in FIG. 7a in cross-section. In the second region 42, the press fitting 100 has an expansion 101, i.e. its inside diameter is increased in at least a part, and preferably in substantially the whole, of this region in comparison with its inside diameter in the third region 44. The expansion 101 is used to receive an annular member 102 which is arranged inside the tubular component. The annular member 102 increases the overall wall thickness of the press fitting 100 in the second region 42 in comparison with the wall thickness of the tubular component 32 in the third region 44. As shown in FIGS. 7a to 7c, the annular member 102 is provided with slots 104 for fitting purposes which allow the member 102 to latch in inside the press fitting.

Figure 8A:
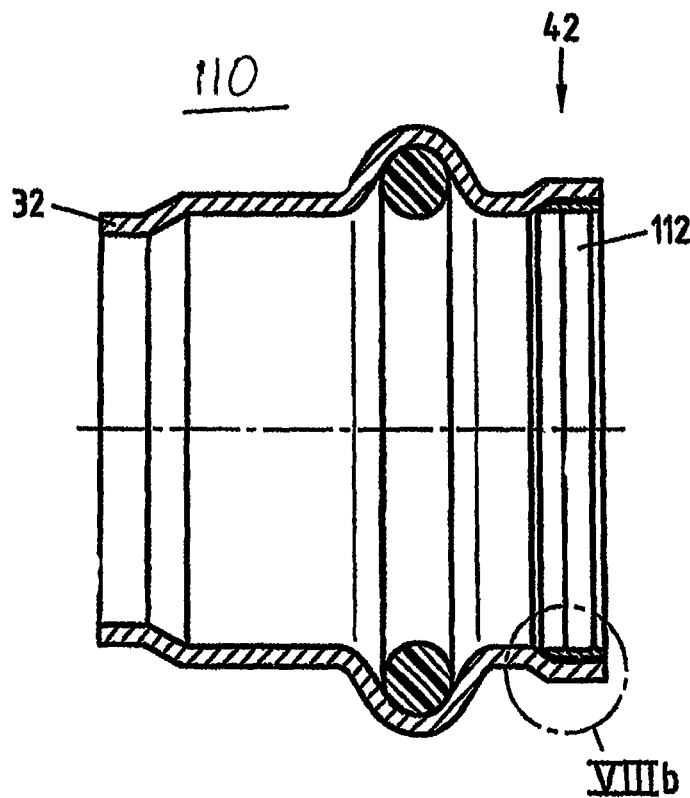
FIGS. 8a-8b show a seventh exemplary embodiment of a press fitting according to the invention.
Figure 8B:
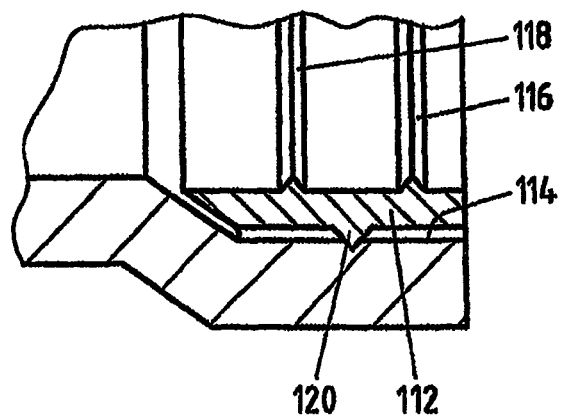

A view in section of a further exemplary embodiment of the press fitting is shown in FIG. 8a. FIG. 8b is an enlarged view of a detail of FIG. 8a. In the press fitting 110, the increased overall wall thickness in the second region 42 of the tubular component 32 is caused by an annular member 112 which is arranged inside the tubular component 32 and which takes the form of a retaining member. For this purpose, the tubular component 32 has, in the second region 42, an expansion 114 which makes it possible for the retaining member 112 to be accommodated. The inside diameter of the retaining member 112 substantially corresponds to the outside diameter of the tube to be inserted. As shown in FIG. 8b, the retaining member 112 has, on its inner face, two annular elevations 116, 118 which, when the press fitting 110 is compressed onto a tube, ensure that the tube which has been inserted is securely fixed in position. An annular elevation 120 is also provided on the outer face of the annular retaining member 112 and this makes a force fit and/or form fit connection between the retaining member 112 and the tubular component 32 and thereby prevents the retaining member from being displaced axially relative to the press fitting 110.

Figure 9:
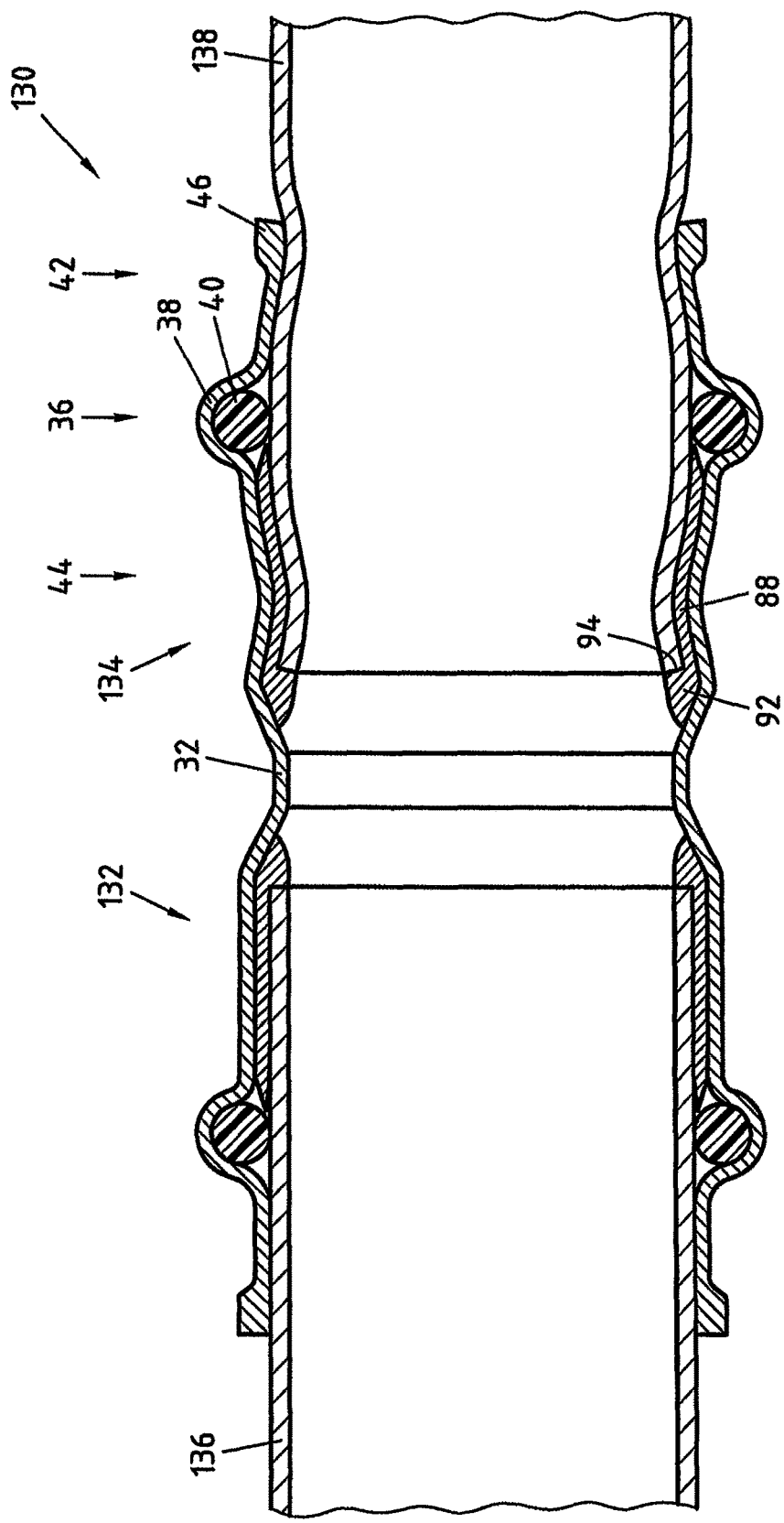
FIG. 9 shows an eighth exemplary embodiment of a press fitting according to the invention.

FIG. 9 shows a further exemplary embodiment of the press fitting. The press fitting 130 takes the form of a tube connector having a first end portion 132 and a second end portion 134 and it differs from the press fitting 80 shown in FIG. 6a in that an annular member 86 is not provided. There is a first tube 136 inserted in the first end portion 132 and a second tube 138 inserted in the second end portion 134. The first end portion 132 is in the uncompressed state whereas the second end portion 134 has already been compressed onto the tube 138. It can clearly be seen that the section made higher by the thickening 46 in the second region 42 of the second end portion 134 has resulted in the tube 138 being more strongly fixed in position. At the same time, it is ensured that the connection is sealed by the sealing member 40 provided in the ridge 38. The sleeve member 88 fills the gap between the tube 138 and the third region 44 of the tubular component 32 and no deposits or contamination by germs can thus form at this point. Also, the thickening 92 of the sleeve member 88 evens up the transition of the interior passage from the tube 138 to the tubular component 32, thus reducing any formation of eddies and loss of pressure.

Figure 12:
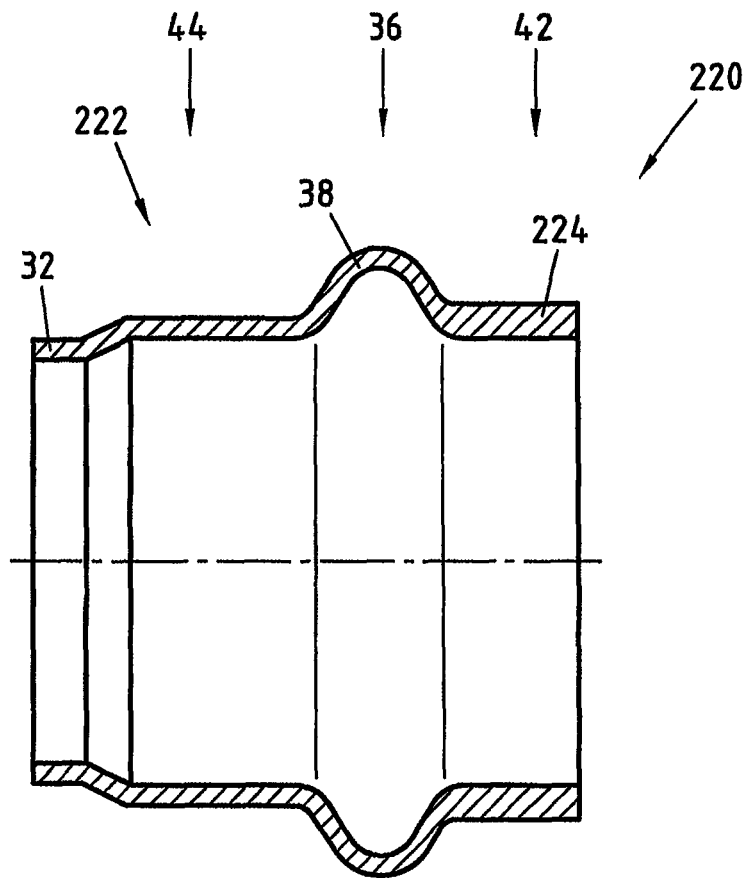
FIG. 12 shows a ninth exemplary embodiment of a press fitting according to the invention.
Figure 13A:
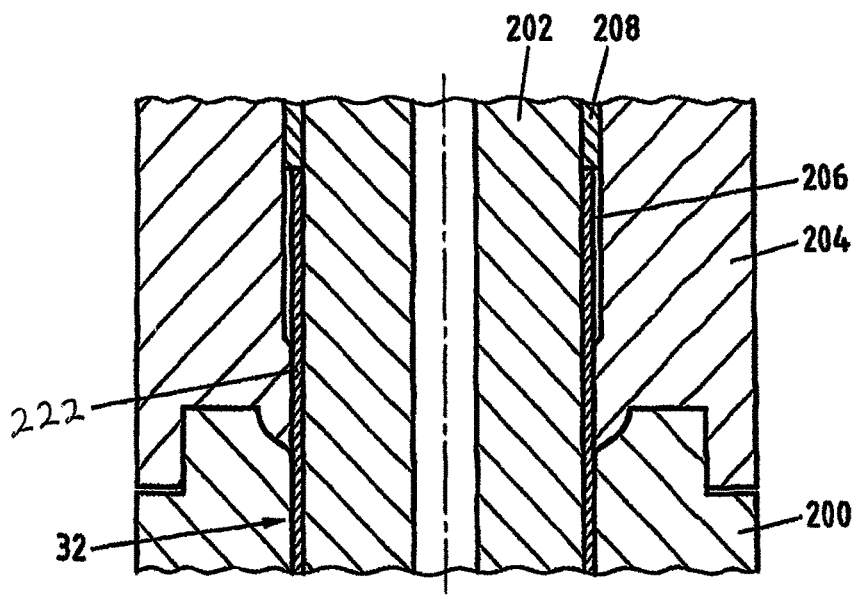
FIGS. 13a-13c are schematic views of steps in a method of producing a press fitting as shown in FIG. 12, FIGS. 14a-14c show the press fitting shown in FIG. 12 at various stages of production.
Figure 13B:
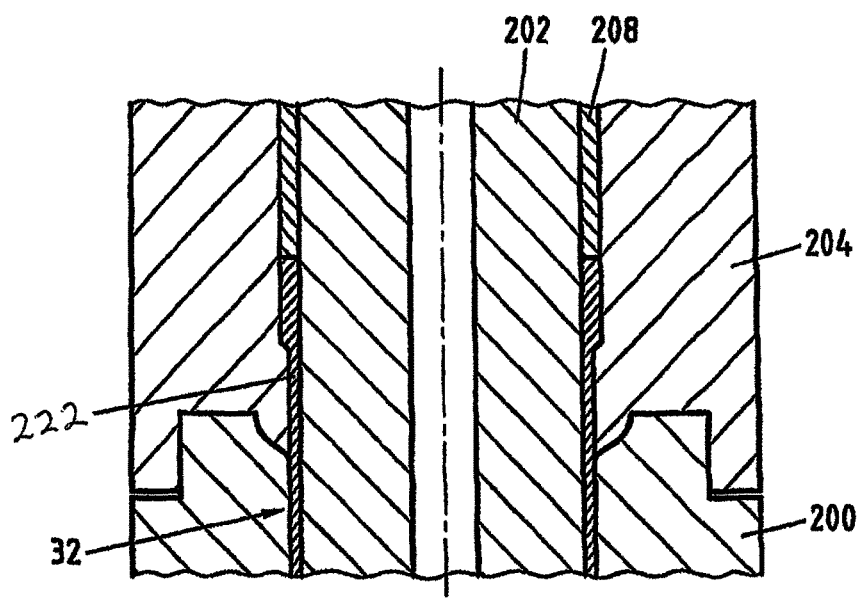
Figure 13C:
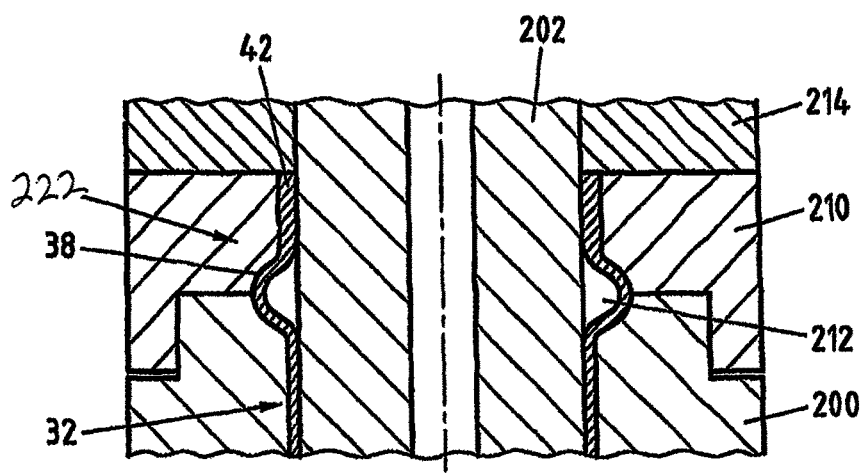

FIG. 12 shows a ninth exemplary embodiment of press fitting 220 according to the invention. The tubular component 32 has an end portion 222 which has a first region 36 having a ridge 38, a second region 42 and a third region 44. In contrast to the first embodiment, the second region 42 is, for its entire length, of an overall wall thickness which is increased by an integral thickening 224 in comparison with the wall thickness of the tubular component 32 in the third region 44. No step is therefore formed along the second region 42.

In a similar way to FIGS. 10a to c and FIGS. 11a to c, FIGS. 13a to c and 14 explain the method of producing the press fitting shown in FIG. 12. In FIG. 13 the same reference numerals indicate the same items as in FIG. 10. The mode of operation is, for the rest, the same as was described in connection with FIG. 10. The difference from FIG. 10 lies in the facts that the gap 206 is of a longer form and that, in the upsetting of the end portion 33, a longer section, namely the entire second region 42, is upset and is of a greater wall thickness than the tubular component 32 in its starting form.

Figure 14C:
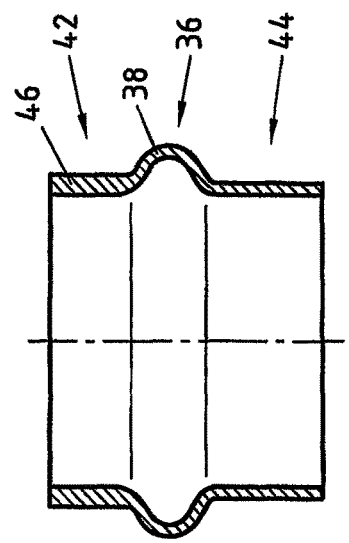
Figure 14B:
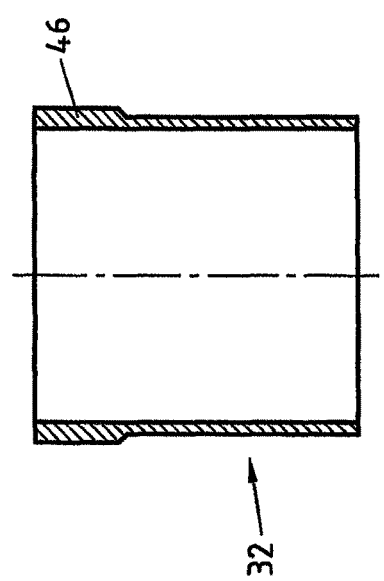
Figure 14A:
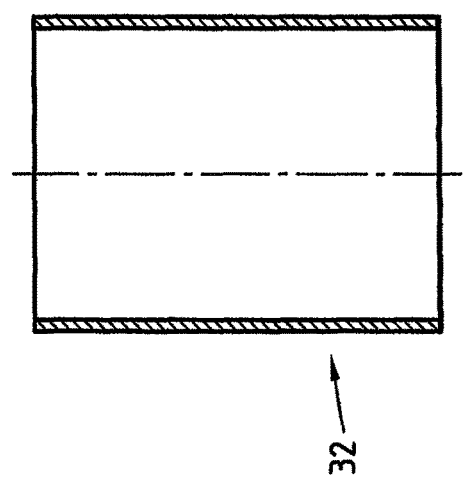

In the same way as FIG. 11, FIG. 14 shows the various forms which the tubular component 32 assumes before, during and after the upsetting. Here too the lengthened region occupied by the thickening 46 can be seen.

Figure 15:
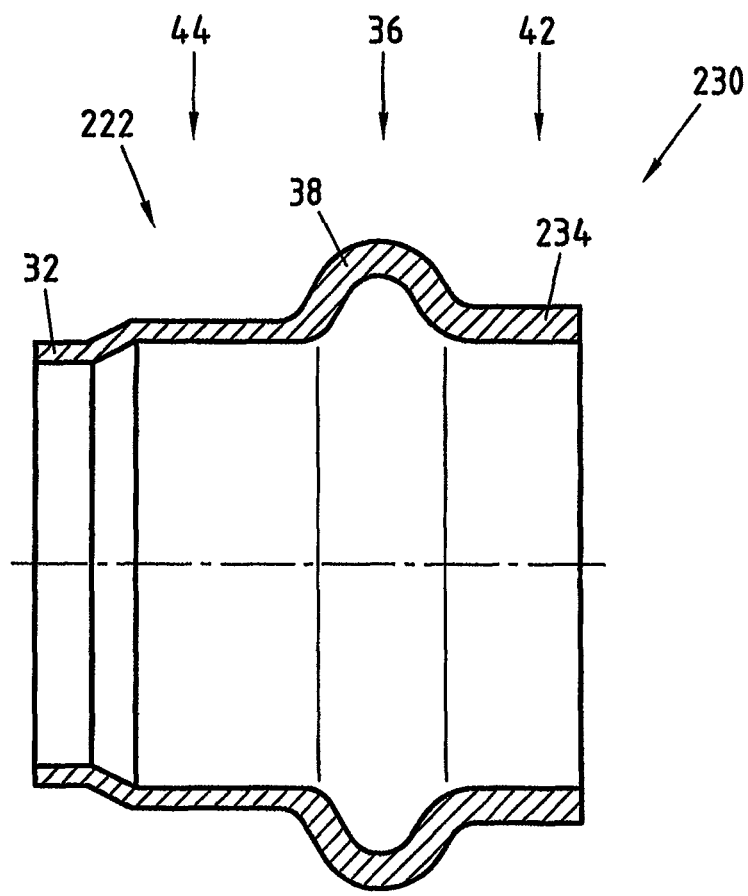
FIG. 15 shows a tenth exemplary embodiment of a press fitting according to the invention.
Figure 16A:
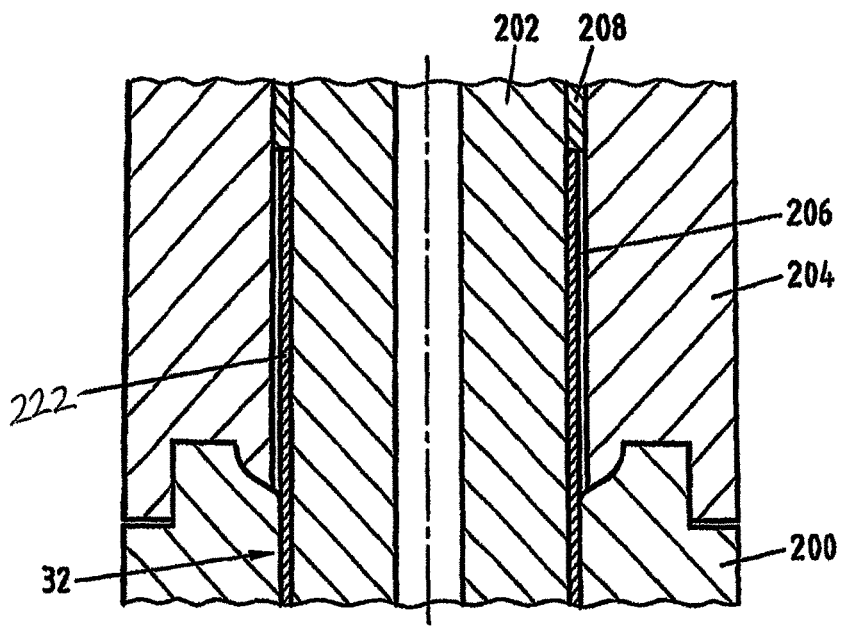
FIGS. 16a-16c are schematic views of steps in a method of producing a press fitting as shown in FIG. 15, FIGS. 17a-17c show the press fitting shown in FIG. 15 at various stages of production.
Figure 16B:
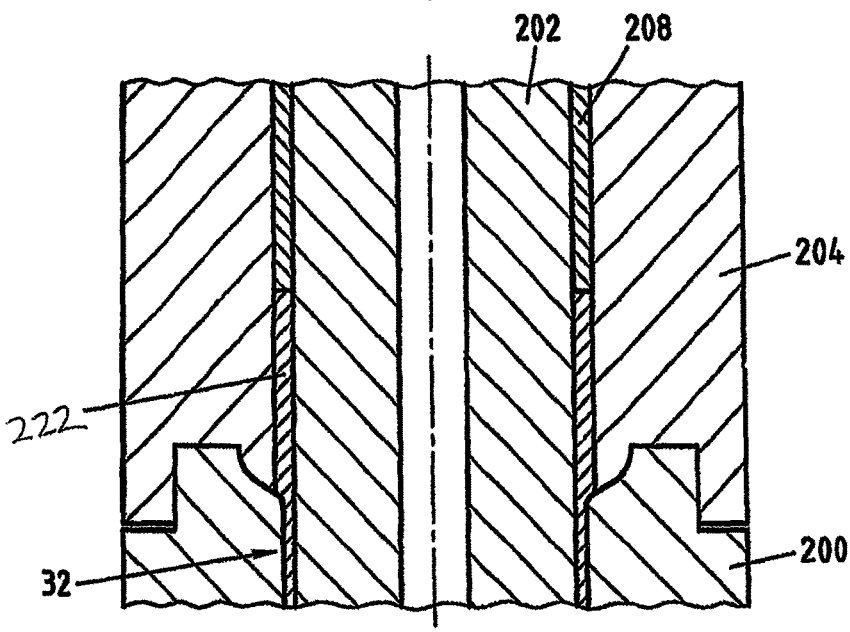
Figure 16C:
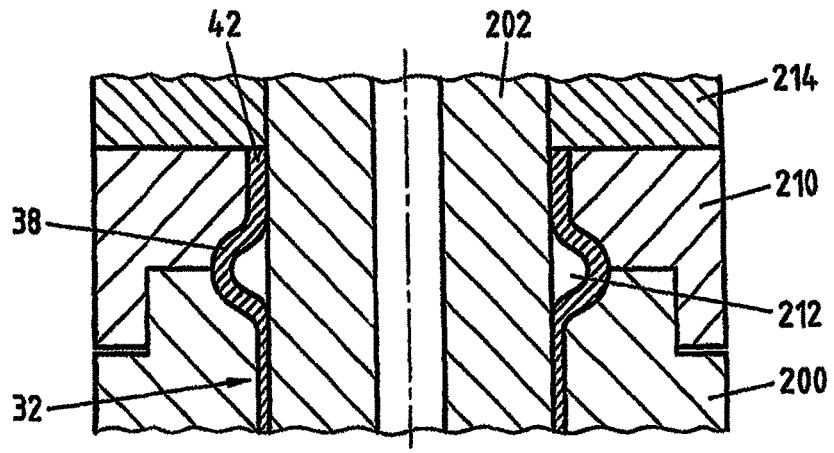
Figure 17C:
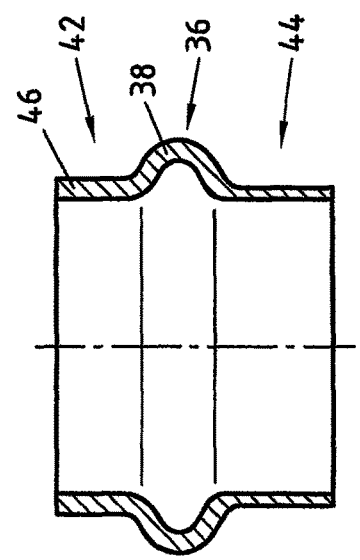
Figure 17B:
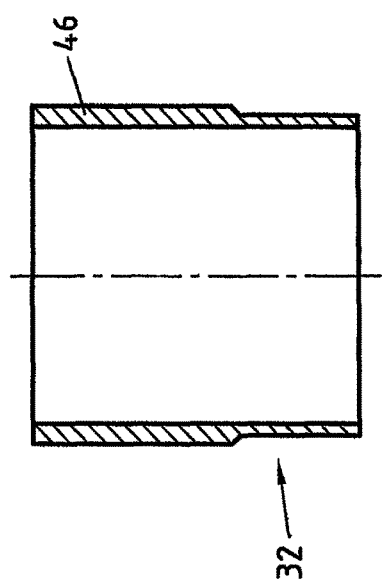
Figure 17A:
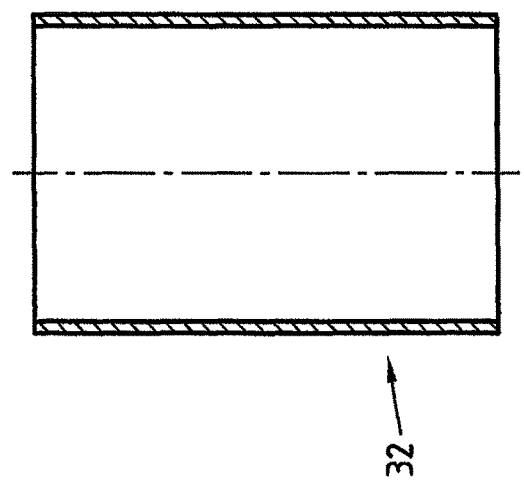

FIG. 15 shows a tenth exemplary embodiment of press fitting 230 according to the invention. As in the first embodiment shown in FIG. 2 and the ninth exemplary embodiment shown in FIG. 12, the tubular component 32 has an end portion 222 which has a first region 36 having a ridge 38, a second region 42 and a third region 44. In contrast to the first and ninth exemplary embodiments, both the second region 42 and the first region 36 are, for their entire length, of an overall wall thickness which is increased by an integral thickening 234 in comparison with the wall thickness of the tubular component 32 in the third region 44. No step is therefore formed along the second region 42 and the ridge 38 too is of a greater wall thickness.

In a similar way to FIG. 10 and FIG. 11, and FIG. 13 and FIG. 14, FIGS. 16a to c and 17a to c explain the method of producing the press fitting shown in FIG. 15. In FIG. 16 the same reference numerals indicate the same items as in FIGS. 10 and 13. The mode of operation is, for the rest, the same as was described in connection with FIG. 10. The difference from FIGS. 10 and 13 lies in the facts that the gap 206 is of an even longer form and that, in the upsetting of the end portion 222, an even longer section, namely the entire second region 42 and the first region 36 having the ridge 38 which it creates, is upset and is of a greater wall thickness than the tubular component 32 in its starting form.

In the same way as FIG. 11 and FIG. 14, FIG. 17 shows the various forms which the tubular component 32 assumes before, during and after the upsetting. Here too the lengthened region occupied by the thickening 46 and the ridge 38 can be seen.

In the exemplary embodiments for the methods of producing the first, ninth and tenth exemplary embodiments according to the invention, the expansion can be performed before or after the upsetting and in particular before or after the making of the ridge. The sequence in which the individual steps of the work done take place may therefore be selected to be such as is best as a function of the material and dimensions of the press fitting.

Figure 18:
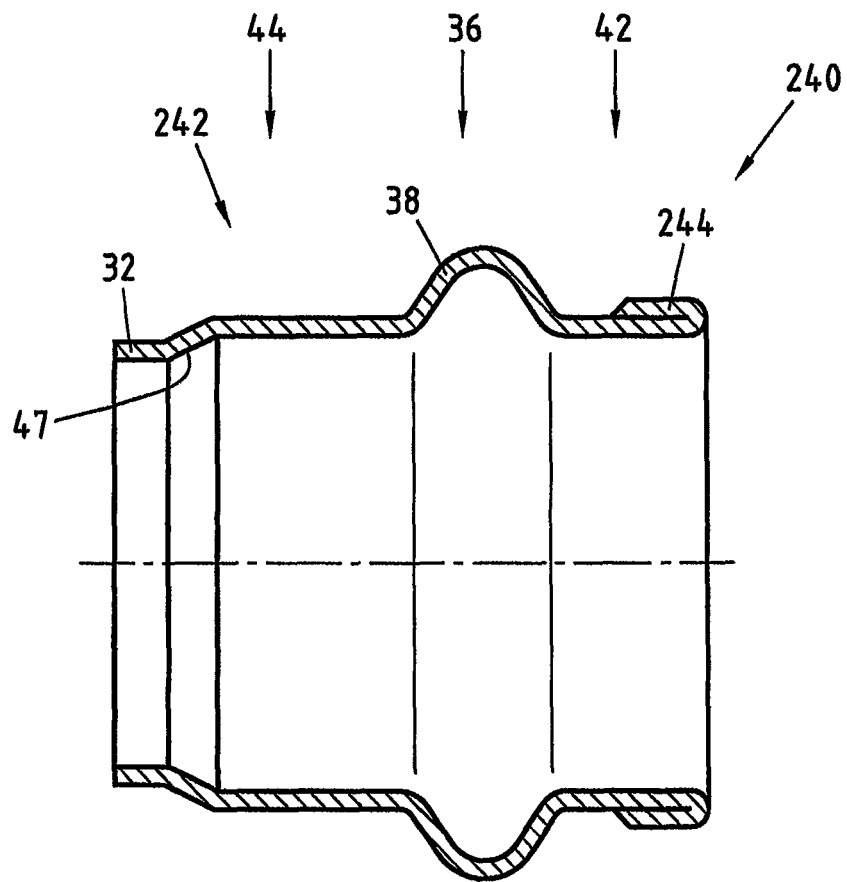
FIG. 18 shows an eleventh exemplary embodiment of a press fitting according to the invention.

FIG. 18 shows an eleventh exemplary embodiment of press fitting 240 according to the invention. The tubular component 32 has an end portion 242 which has a first region 36 having a ridge 38, a second region 42 and a third region 44. At least part of the second region 42 is folded over outwards and is thus integrally formed to be in two layers in the region of the folding-over 244.

Figure 19:
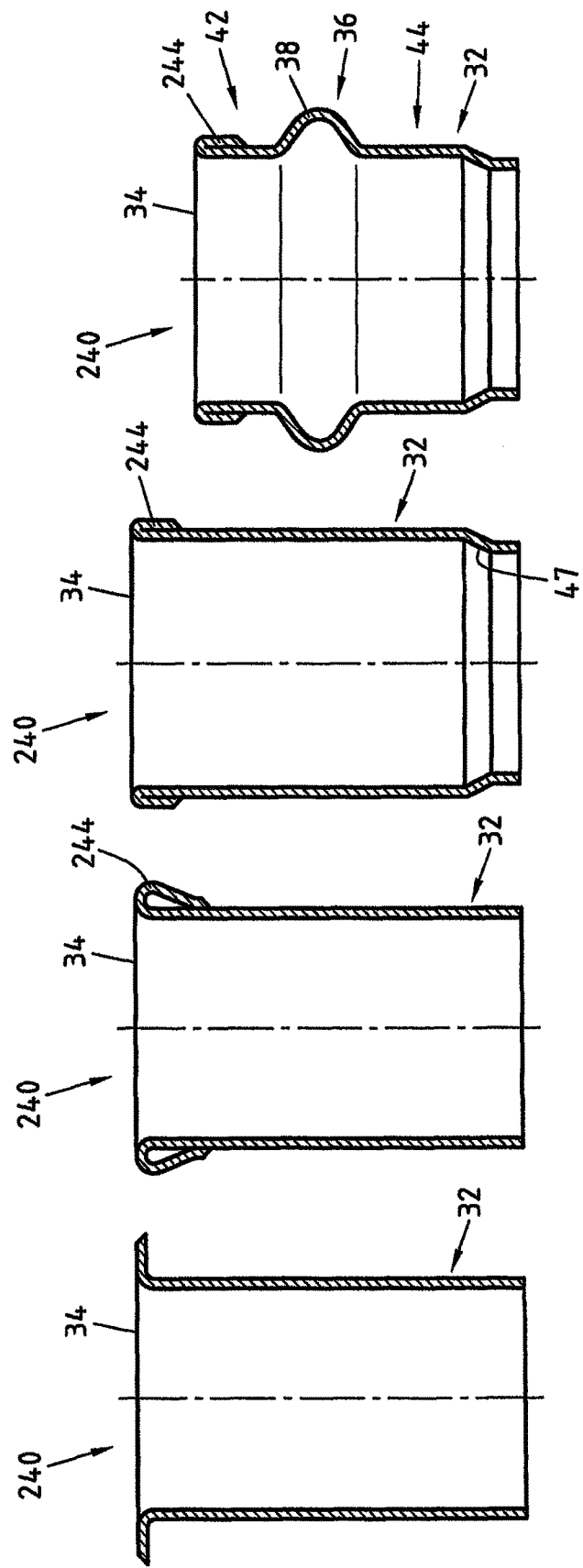
FIGS. 19a-19d show the press fitting shown in FIG. 18 at various stages of production.

FIG. 19 show the various forms assumed by the press fitting 240 during production. FIG. 19a shows the tubular component 32 whose edge in the region of the opening 34 has first been folded outwards through 90°. FIG. 19b shows the complete folding-over 244. In the next step (see FIG. 19c), the component 32 is expanded from the end at which the opening 34 is situated, as a result of which on the one hand the folding-over 244 is pressed flat and assumes a two-layered form and on the other hand the abutment 47 is formed, which is provided for the purpose of positioning a tube within the press fitting. Then, as shown in FIG. 19d, the ridge 38 is formed, thus producing the three regions 36, 42 and 44 such as have already been shown in FIG. 18.

Figure 20:
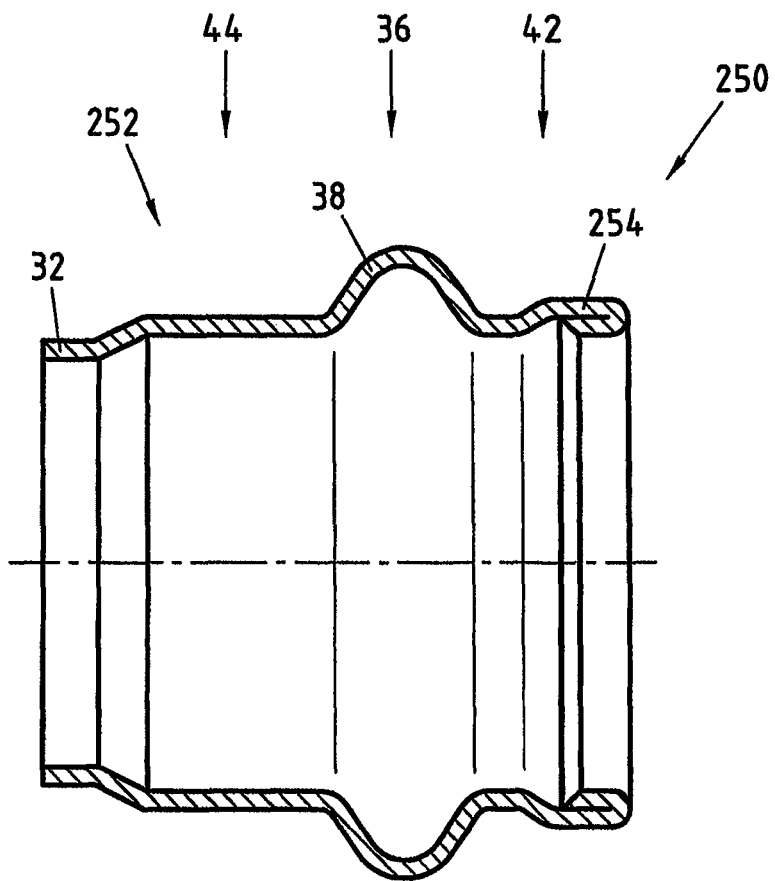
FIG. 20 shows a twelfth exemplary embodiment of a press fitting according to the invention.

FIG. 20 shows a twelfth exemplary embodiment of press fitting 250 according to the invention. The tubular component 32 has an end portion 252 which has a first region 36 having a ridge 38, a second region 42 and a third region 44. At least part of the second region 42 is folded over inwards and is thus of an integral two-layered form in the region of the folding-over 254.

FIG. 21 shows the various forms assumed by the press fitting 250 during production. FIG. 21a shows the tubular component 32, which has already been expanded and has an abutment 47 for a tube to be inserted. The edge of the component 32 has been folded over inwards in the region of the opening 34. FIG. 21b shows the complete folding-over which is produced by a second expansion, which extends only over the second region 42. In the next step (see FIG. 21c) the ridge 38 is formed, thus producing the three regions 36, 42 and 44 such as have already been shown in FIG. 20.

There is a further advantage that the folding-over inwards has. The edge 256 produced by the inwardly directed folding-over 254 results, in the course of the compression onto an inserted tube, in an additional edge which is able to press itself into the material of the tube. This strengthens the locking of the tube inside the press fitting 250.

To adapt the press fitting to meet the requirements set for it in particular cases, the features of the press fittings shown in the different designs and exemplary embodiments can of course advantageously be combined with one another.

The invention claimed is:

1. A press fitting, comprising:
a tubular component comprising an end portion which can be compressed to make a connection to a tube, wherein the tubular component comprises an outer surface and an inner surface, wherein a contour of the inner surface follows a contour of the outer surface along an entire length of the end portion, wherein the end portion comprises:
an opening to receive the tube;
a first region being an annular ridge to receive a sealing ring;
a second region immediately adjacent to the first region, the second region arranged on a side of the first region closer to the opening, wherein the second region extends an entire length from the side of the first region closer to the opening to the opening; and
a third region immediately adjacent to the first region, the third region arranged on a side of the first region remote from the opening, the third region extending from the side of the first region remote from the opening,
wherein an overall wall thickness of the tubular component in the second region is increased over an entire length of the second region in comparison with a wall thickness of the tubular component in the third region, and
wherein at least the first region and the second region of the end portion are configured to be compressed onto the tube during installation such that the tube is securely fixed to the press fitting.

2. The press fitting according to claim 1, wherein the overall wall thickness of the tubular component in the second region is increased at least in a section thereof by at least 50% in comparison with the wall thickness of the tubular component in the third region.

3. The press fitting according to claim 1, wherein a wall thickness of the tubular component is smaller in a region of the ridge than the overall wall thickness of the tubular component in the second region.

4. The press fitting according to claim 1, wherein the press fitting is adapted for use with piping and tubing systems for drinking water or non-drinking water and for gas and heating piping and tubing systems.

5. The press fitting according to claim 1, wherein the overall wall thickness of the tubular component in the second region is increased at least in a section thereof by at least 75% in comparison with the wall thickness of the tubular component in the third region.

6. The press fitting according to claim 1, wherein the overall wall thickness of the tubular component in the second region is increased at least in a section thereof by at least 100% in comparison with the wall thickness of the tubular component in the third region.

\* \* \* \* \*